United States Patent
Kenny et al.

(10) Patent No.: US 10,160,623 B2
(45) Date of Patent: Dec. 25, 2018

(54) COMPACT COMPOSITE HANDRAILS WITH ENHANCED MECHANICAL PROPERTIES

(71) Applicant: EHC Canada, Inc., Oshawa (CA)

(72) Inventors: Andrew Oliver Kenny, Toronto (CA); Reginald Anthony Butwell, Young's Point (CA); Jason Wong, Ajax (CA)

(73) Assignee: EHC CANADA, INC., Oshawa (CA)

( * ) Notice: Subject to any disclaimer, the term of this patent is extended or adjusted under 35 U.S.C. 154(b) by 0 days.

(21) Appl. No.: 15/570,012

(22) PCT Filed: May 6, 2016

(86) PCT No.: PCT/CA2016/050522
§ 371 (c)(1),
(2) Date: Oct. 27, 2017

(87) PCT Pub. No.: WO2016/176778
PCT Pub. Date: Nov. 10, 2016

(65) Prior Publication Data
US 2018/0111799 A1    Apr. 26, 2018

Related U.S. Application Data (60) Provisional application No. 62/158,348, filed on May 7, 2015.

(51) Int. Cl.
*B66B 23/24* (2006.01)
*B32B 3/00* (2006.01)
(Continued)

(52) U.S. Cl.
CPC .............. *B66B 23/24* (2013.01); *B29C 61/02* (2013.01); *B32B 1/00* (2013.01); *B32B 3/04* (2013.01);
(Continued)

(58) Field of Classification Search
CPC .. B66B 23/24; B32B 3/00; B32B 3/08; B32B 27/08
(Continued)

(56) References Cited

U.S. PATENT DOCUMENTS 815,571 A    3/1906  Williams
1,049,613 A  1/1913  Seeburger
(Continued)

FOREIGN PATENT DOCUMENTS

CA    898726    4/1972
CA    936569    11/1973
(Continued)

OTHER PUBLICATIONS

Elevator World, Patents, Dec. 1990, p. 87.
(Continued)

*Primary Examiner* — Douglas A Hess
(74) *Attorney, Agent, or Firm* — Bereskin & Parr LLP/S.E.N.C.R.L., s.r.l.

(57) ABSTRACT

A handrail includes a carcass, a stretch inhibitor arranged within the carcass, a cover bonded to the carcass, and a sliding layer secured to the carcass. At a central width axis of the handrail, a face height between an upper exterior surface of the cover and a bottom surface of the sliding layer may be less than about 8.0 mm. The carcass may be formed of a first thermoplastic material, the cover may be formed of a second thermoplastic material, and the first thermoplastic material may be harder than the second thermoplastic material. The first thermoplastic material may have a modulus at 100% elongation of between 10 and 16 MPa, and may have a hardness of between 93 and 96 Shore A.

20 Claims, 9 Drawing Sheets (51) Int. Cl.

| | | |
|---|---|---|
| *B32B 3/08* | (2006.01) | |
| *B32B 27/08* | (2006.01) | |
| *B29C 61/02* | (2006.01) | |
| *B32B 3/04* | (2006.01) | |
| *B32B 5/02* | (2006.01) | |
| *B32B 27/12* | (2006.01) | |
| *B32B 27/36* | (2006.01) | |
| *B32B 27/40* | (2006.01) | |
| *B32B 1/00* | (2006.01) | |
| *B32B 7/02* | (2006.01) | |

(52) U.S. Cl.
CPC ............... *B32B 5/024* (2013.01); *B32B 7/02* (2013.01); *B32B 27/08* (2013.01); *B32B 27/12* (2013.01); *B32B 27/36* (2013.01); *B32B 27/40* (2013.01); *B32B 2250/44* (2013.01); *B32B 2262/0276* (2013.01); *B32B 2274/00* (2013.01); *B32B 2307/21* (2013.01); *B32B 2307/536* (2013.01); *B32B 2307/54* (2013.01); *B32B 2307/546* (2013.01); *B32B 2307/732* (2013.01); *B32B 2307/736* (2013.01); *B32B 2307/744* (2013.01); *B32B 2419/00* (2013.01)

(58) Field of Classification Search
USPC .......................................... 198/335, 336, 337
See application file for complete search history.

(56) References Cited

U.S. PATENT DOCUMENTS

| | | | |
|---|---|---|---|
| 1,101,209 A | 6/1914 | Pitt | |
| 1,186,550 A | 6/1916 | Cobb | |
| 2,373,764 A | 4/1945 | Lautrup et al. | |
| 2,669,339 A | 2/1954 | Hansen | |
| 2,721,158 A | 10/1955 | Mans | |
| 2,879,881 A | 3/1959 | Tilton | |
| 2,956,662 A | 10/1960 | Hansen | |
| 2,979,431 A | 4/1961 | Perrault | |
| 3,039,142 A | 6/1962 | Zavasnik | |
| 3,048,256 A | 8/1962 | Skinner | |
| 3,212,627 A | 10/1965 | Beebee | |
| 3,348,585 A | 10/1967 | Post et al. | |
| 3,411,980 A | 11/1968 | Leshin | |
| 3,414,109 A | 12/1968 | Clark | |
| 3,463,290 A | 8/1969 | Tajima | |
| 3,481,807 A | 12/1969 | Kanamori | |
| 3,616,496 A | 11/1971 | Anglioletti et al. | |
| 3,623,590 A | 11/1971 | Johnson | |
| 3,633,725 A | 1/1972 | Smith | |
| RE27,439 E | 7/1972 | Jackson | |
| 3,689,341 A | 9/1972 | Ninomiya | |
| 3,693,218 A | 9/1972 | Jaubert et al. | |
| 3,724,645 A | 4/1973 | Spaar | |
| 3,737,262 A | 6/1973 | Klein | |
| 3,778,882 A | 12/1973 | Cameron et al. | |
| 3,783,063 A | 1/1974 | Olsson | |
| 3,783,704 A | 1/1974 | Lawson | |
| 3,824,777 A | 7/1974 | Riggs | |
| 3,865,225 A | 2/1975 | Phal | |
| 3,872,735 A | 3/1975 | Hnatek | |
| 3,874,968 A | 4/1975 | Robinson | |
| 3,885,071 A | 5/1975 | Blad et al. | |
| 3,909,176 A | 9/1975 | Madonini | |
| 3,949,858 A | 4/1976 | Ballocci et al. | |
| 3,956,056 A | 5/1976 | Boguslawski et al. | |
| 3,981,206 A | 9/1976 | Miranti, Jr. et al. | |
| 4,032,384 A | 6/1977 | Rauscher | |
| 4,034,617 A | 7/1977 | Guyer | |
| 4,050,322 A | 9/1977 | Moring | |
| 4,057,956 A | 11/1977 | Tolle | |
| 4,059,974 A | 11/1977 | Fleissner | |
| 4,087,223 A | 5/1978 | Angioletti et al. | |
| 4,093,499 A | 6/1978 | Naka | |
| 4,134,883 A | 1/1979 | Mendelsohn et al. | |
| 4,150,929 A | 4/1979 | Brandt | |
| 4,161,769 A | 7/1979 | Elliott | |
| 4,169,393 A | 10/1979 | Wetzel et al. | |
| 4,171,840 A | 10/1979 | Berzenye | |
| 4,274,821 A | 6/1981 | Kiemer | |
| 4,359,501 A | 11/1982 | DiTullio | |
| 4,381,273 A | 4/1983 | Azzola | |
| 4,427,107 A | 1/1984 | Roberts et al. | |
| 4,439,387 A | 3/1984 | Hawley | |
| 4,441,946 A | 4/1984 | Sharma | |
| 4,469,729 A | 9/1984 | Watanabe et al. | |
| 4,548,663 A | 10/1985 | Worcester | |
| 4,563,140 A | 1/1986 | Turecek | |
| 4,564,542 A | 1/1986 | Worcester | |
| 4,578,024 A | 3/1986 | Sicka et al. | |
| 4,581,807 A | 4/1986 | Adell | |
| 4,600,549 A | 7/1986 | Rajala et al. | |
| 4,609,515 A | 9/1986 | Smyth | |
| 4,618,387 A | 10/1986 | Fisher et al. | |
| 4,650,446 A | 3/1987 | Pinto et al. | |
| 4,656,086 A | 4/1987 | Bowers et al. | |
| 4,681,646 A | 7/1987 | Pinto et al. | |
| 4,767,244 A | 8/1988 | Peterson | |
| 4,776,446 A | 10/1988 | Fisher et al. | |
| 4,808,098 A | 2/1989 | Chan et al. | |
| 4,839,220 A | 6/1989 | Stijntjes et al. | |
| 4,852,713 A | 8/1989 | Tatai et al. | |
| 4,891,040 A | 1/1990 | Nagai et al. | |
| 4,904,425 A | 2/1990 | Hebels et al. | |
| 4,934,100 A | 6/1990 | Adell | |
| 4,946,020 A | 8/1990 | Rivera et al. | |
| 4,948,354 A | 8/1990 | Minaudo | |
| 4,957,199 A | 9/1990 | Wokke et al. | |
| 4,982,829 A | 1/1991 | Johnson et al. | |
| 5,020,256 A | 6/1991 | French | |
| 5,083,985 A | 1/1992 | Alles | |
| 5,087,488 A | 2/1992 | Cakmakci | |
| 5,096,645 A | 3/1992 | Fink | |
| 5,115,900 A | 5/1992 | Nurnberg et al. | |
| 5,160,009 A | 11/1992 | Iyoda et al. | |
| 5,162,151 A | 11/1992 | Smith et al. | |
| 5,165,643 A | 11/1992 | Shreiner | |
| 5,226,522 A * | 7/1993 | Johnson ................ B66B 23/24 | |
| | | | 198/335 |
| 5,255,772 A | 10/1993 | Ball et al. | |
| 5,275,270 A * | 1/1994 | Dobo ..................... B66B 23/24 | |
| | | | 198/337 |
| 5,299,362 A | 4/1994 | Baldinger | |
| 5,508,103 A | 4/1996 | Cope | |
| 5,681,652 A | 10/1997 | Cope | |
| 6,086,806 A | 7/2000 | Weatherall et al. | |
| 6,237,740 B1 | 5/2001 | Weatherall et al. | |
| 6,395,210 B1 | 5/2002 | Head et al. | |
| 6,673,431 B1 | 1/2004 | Ledzinski | |
| 6,761,259 B1 | 7/2004 | Onodera et al. | |
| 7,200,915 B2 * | 4/2007 | Keun ................... B29C 65/5035 | |
| | | | 198/337 |
| 7,398,869 B2 | 7/2008 | Novacek et al. | |
| 7,404,477 B1 | 7/2008 | Toennisson et al. | |
| 7,594,570 B2 | 9/2009 | Miessbacher | |
| 7,641,038 B2 | 1/2010 | El-Wardany et al. | |
| 7,766,150 B2 | 8/2010 | Guo et al. | |
| 8,006,823 B2 | 8/2011 | Holzner et al. | |
| 8,061,215 B2 * | 11/2011 | Caunce ..................... G01L 5/102 | |
| | | | 73/826 |
| 8,186,498 B2 | 5/2012 | Kawasaki et al. | |
| 8,206,528 B2 | 6/2012 | Qureshi | |
| 8,323,544 B2 | 12/2012 | Haider et al. | |
| 8,721,949 B2 * | 5/2014 | Wesson ................. B66B 23/24 | |
| | | | 198/335 |
| 8,820,511 B2 | 9/2014 | Haider et al. | |
| 9,126,805 B2 | 9/2015 | Pelto-Huikko et al. | |
| 9,481,552 B2 * | 11/2016 | Kawasaki ............. B66B 23/24 | |
| 9,579,839 B2 | 2/2017 | Kenny et al. | |
| 2002/0084169 A1 | 7/2002 | Schulte et al. | |
| 2004/0045652 A1 | 3/2004 | Vanneste et al. | |
| 2005/0147702 A1 | 7/2005 | Highashi | |
| 2005/0173224 A1 | 8/2005 | Caunce | |

(56) References Cited

U.S. PATENT DOCUMENTS

| | | |
|---|---|---|
| 2006/0237284 A1 | 10/2006 | Miessbacher |
| 2007/0102183 A1 | 5/2007 | Jotti et al. |
| 2007/0125301 A1 | 6/2007 | Zhou et al. |
| 2007/0126142 A1 | 6/2007 | Zhou et al. |
| 2009/0127067 A1 | 5/2009 | Guo et al. |
| 2009/0218192 A1 | 9/2009 | Holzner et al. |
| 2009/0308173 A1 | 12/2009 | Caunce et al. |
| 2010/0117263 A1 | 5/2010 | Wesson et al. |
| 2010/0237535 A1 | 9/2010 | Haider et al. |
| 2010/0258403 A1* | 10/2010 | Haider ............... B32B 3/00 198/337 |
| 2010/0283173 A1* | 11/2010 | Kenny ............... B29C 47/027 264/101 |
| 2011/0000746 A1 | 1/2011 | Pelto-Huikko et al. |
| 2012/0321734 A1 | 12/2012 | Kenny et al. |
| 2013/0062146 A1 | 3/2013 | Nolting et al. |
| 2014/0305744 A1 | 10/2014 | Kere et al. |
| 2014/0305745 A1 | 10/2014 | Alasentie et al. |
| 2015/0283750 A1 | 10/2015 | Kenny et al. |

FOREIGN PATENT DOCUMENTS

| | | |
|---|---|---|
| CA | 1048301 | 2/1979 |
| CA | 1163879 A | 3/1984 |
| CA | 1261583 | 9/1989 |
| CA | 1305597 C | 7/1992 |
| CA | 2333553 A1 | 1/2000 |
| CA | 2343037 A1 | 3/2000 |
| CA | 2482620 A1 | 3/2005 |
| CA | 2711074 C | 7/2009 |
| CA | 2914023 A1 | 7/2009 |
| CN | 1139613 A | 1/1997 |
| CN | 1307537 A | 8/2001 |
| CN | 1097027 C | 12/2002 |
| CN | 100484739 C | 5/2009 |
| CN | 10-3991205 A | 8/2014 |
| DE | 545937 C | 3/1932 |
| DE | 839624 | 5/1952 |
| DE | 860477 | 12/1952 |
| DE | 907996 | 4/1954 |
| DE | 1027539 | 4/1958 |
| DE | 1127279 | 4/1962 |
| DE | 1019958 | 12/1964 |
| DE | 1936192 | 5/1970 |
| DE | 2000266 | 7/1971 |
| DE | 2142098 | 3/1973 |
| DE | 2257938 A1 | 6/1974 |
| DE | 2911753 A1 | 10/1980 |
| DE | 2916253 | 10/1980 |
| DE | 3149783 A1 | 7/1982 |
| DE | 3106253 A1 | 9/1982 |
| DE | 3113810 A1 | 10/1982 |
| DE | 3208916 A1 | 9/1983 |
| DE | 3433914 A1 | 3/1986 |
| DE | 3836788 C1 | 8/1989 |
| DE | 3704524 A1 | 11/1989 |
| DE | 3921887 A1 | 1/1991 |
| DE | 3921888 A1 | 1/1991 |
| DE | 3930351 A1 | 3/1991 |
| DE | 4118946 A1 | 5/1992 |
| DE | 10124362 A1 | 12/2002 |
| EP | 0134545 | 3/1985 |
| EP | 0185006 | 6/1986 |
| EP | 0273479 | 6/1988 |
| EP | 0444245 A1 | 9/1991 |
| EP | 1172476 A1 | 1/2002 |
| EP | 1831454 B1 | 3/2011 |
| EP | 2159184 B1 | 8/2014 |
| FR | 1244910 A | 11/1960 |
| FR | 2161856 | 7/1973 |
| FR | 2442935 | 6/1980 |
| GB | 1355039 | 5/1974 |
| GB | 1362513 A | 8/1974 |
| GB | 1362514 A | 8/1974 |
| GB | 2243163 | 10/1991 |
| JP | 51-10585 A | 1/1976 |
| JP | 52-16629 | 5/1977 |
| JP | 57-121684 A | 7/1982 |
| JP | 58-171594 | 10/1983 |
| JP | 58-222833 | 12/1983 |
| JP | 59-57878 A | 4/1984 |
| JP | S59-57464 U | 4/1984 |
| JP | 59-85728 | 5/1984 |
| JP | 62-189147 | 8/1987 |
| JP | 56-169886 A | 12/1987 |
| JP | 63-10266 Y2 | 3/1988 |
| JP | 2-277848 | 11/1990 |
| JP | 4-106092 | 4/1992 |
| JP | 4-185788 | 7/1992 |
| JP | 4-194011 | 7/1992 |
| JP | 06-071780 A | 3/1994 |
| JP | 7-33376 A | 2/1995 |
| JP | H07-047583 A | 2/1995 |
| JP | 7-206351 | 8/1995 |
| JP | 2000-071353 A | 3/2000 |
| JP | 2002255470 A | 9/2002 |
| JP | 2003-327380 A | 11/2003 |
| JP | 2004-238136 A | 8/2004 |
| JP | 2006-076069 A | 3/2006 |
| JP | 2007084979 | 4/2007 |
| JP | 2007246176 | 9/2007 |
| JP | 4463052 B2 | 5/2010 |
| JP | 2012-11718 A | 1/2012 |
| JP | 5772744 B2 | 9/2015 |
| SU | 458496 A1 | 1/1975 |
| SU | 1579452 A3 | 7/1990 |
| SU | 1717393 A1 | 3/1992 |
| TW | 460405 B | 10/2001 |
| WO | 00/01607 A1 | 1/2000 |
| WO | 2000/010607 A1 | 1/2000 |
| WO | 0156914 A1 | 8/2001 |
| WO | 2003/042085 A2 | 5/2003 |
| WO | 2005/028231 A1 | 3/2005 |
| WO | 2005/054569 A2 | 6/2005 |
| WO | 2006/110136 A1 | 10/2006 |
| WO | 2007/075162 A1 | 7/2007 |
| WO | 2007/123534 A1 | 11/2007 |
| WO | 2009/033270 A1 | 3/2009 |
| WO | 2009/033272 | 3/2009 |
| WO | 2009/033273 A1 | 3/2009 |
| WO | 2013/110853 A1 | 8/2013 |
| WO | 2014/175051 A1 | 10/2014 |
| WO | 2015/046041 A1 | 4/2015 |
| WO | 2015/182739 A1 | 12/2015 |
| WO | 2016/176778 A1 | 6/2016 |
| WO | 2016/201578 A1 | 12/2016 |

OTHER PUBLICATIONS

Eckstein et al., Thermoforming Thermoplastic Polyurethanes, Plastics Engineering, May 1995, p. 29.

International Search Report dated Jul. 6, 2016 in respect of International Application No. PCT/CA2016/050522.

Written Opinion of the International Search Authority dated Jul. 6, 2016 in respect of International Application No. PCT/CA2016/050522.

International Preliminary Report on Patentability Chapter I dated Nov. 7, 2017 in respect of International Application No. PCT/CA2016/050522.

Declaration of Andrew Oliver Kenny.

* cited by examiner

COMPACT COMPOSITE HANDRAILS WITH ENHANCED MECHANICAL PROPERTIES

CROSS-REFERENCE TO RELATED APPLICATION

This is a national stage application of International Application No. PCT/CA2016/050522 filed on May 6, 2016, which claims priority to U.S. Provisional Application No. 62/158,348 filed on May 7, 2015, and the entire contents of each are hereby incorporated herein by reference.

FIELD

The present disclosure relates generally to handrails suitable for use with an escalator, a moving walkway and/or other transportation apparatus.

BACKGROUND

The following paragraphs are not an admission that anything discussed in them is prior art or part of the knowledge of persons skilled in the art.

International Publication No. WO/2000/001607 discloses a moving handrail construction, for escalators, moving walkways and other transportation apparatus with a handrail having a generally C-shaped cross section and defining an internal generally T-shaped slot. The handrail is formed by extrusion and comprises a first layer of thermoplastic material extending around the T-shaped slot. A second layer of thermoplastic material extends around the outside of the first layer and defines the exterior profile of the handrail. A slider layer lines the T-shaped slot and is bonded to the first layer. A stretch inhibitor extends within the first layer. The first layer is formed from a harder thermoplastic than the second layer, and this has been found to give improved properties to the lip and improved drive characteristics on linear drives.

International Publication No. WO/2009/033270 discloses a method and apparatus for extrusion of an article. A die assembly can apply flows of thermoplastic material to an array of reinforcing cables to form a composite extrusion. A slider fabric can be bonded to one side of the composite extrusion. After exiting the die assembly, the slider fabric can act to support the extrudate as it passes along an elongate mandrel, which can cause the base of the slider fabric to change shape from a flat profile to the final internal profile of the article. The extruded article can then be cooled to solidify the material. The die can include cooling for the slider fabric and means for promoting penetration of the thermoplastic into reinforcing cables.

International Publication No. WO/2009/033272 discloses modified handrails for use in escalators, moving walkways and other transportation apparatus. Handrail can include a configuration for a cable array as a stretch inhibitor that reduces cable buckling under severe flexing conditions. Handrail can also include a configuration for first and second thermoplastic layers in the lip portions that reduces strain and bending stresses and increases fatigue failure life under cyclic loading conditions. Handrail can also include, for the stretch inhibitor, the use of cables comprising large outer strands and small inner strands that enable penetration and adhesion within the first layer and can reduce incidence of fretting or corrosion.

International Publication No. WO/2009/033273 discloses a method and apparatus for pretreatment of slider layer for extruded handrails having a slider layer source, a means of conveying the slider layer to a heating module which subjects the slider layer to an elevated temperature for a residence time, and a means of conveying the slider layer to an extrusion die head. One or more control feeders may be implemented for maintaining portions of the slider layer in a substantially tension-free loop as the slider layer is conveyed from the slider layer source to the extrusion die head. A cooling zone may be included to ensure adequate cooling between the heating module and the extrusion die head. Means for reducing heat transfer between the extrusion die head and the slider layer is also provided.

The entire contents of International Publication Nos. WO/2000/001607, WO/2009/033270, WO/2009/033272 and WO/2009/033273 are hereby incorporated herein by reference.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Figure 1:
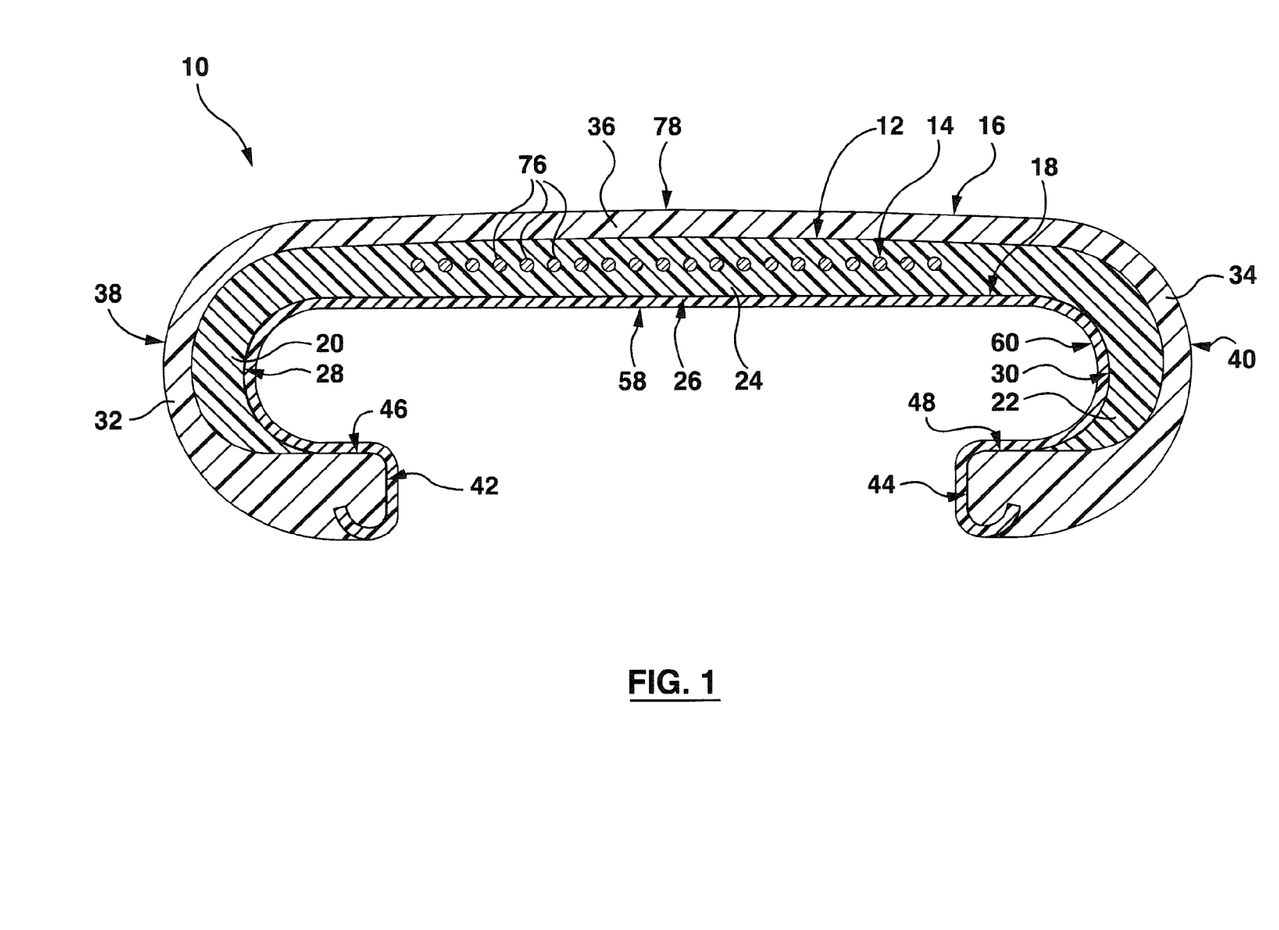
FIG. 1 is a sectional view of an example of a handrail.

Referring to FIG. 1, a handrail is shown generally at reference numeral 10. The handrail 10 includes a carcass 12, a stretch inhibitor 14, a cover 16, and a sliding layer 18.

In the example illustrated, the carcass 12 includes a first side carcass portion 20, a second side carcass portion 22 spaced apart from the first side carcass portion 20, and a central carcass portion 24 of generally uniform thickness extending between the first and second side carcass portions 20, 22. The stretch inhibitor 14 is shown arranged within the central carcass portion 24. The carcass 12 is shown tapering in thickness around the first and second side carcass portions 20, 22. The central carcass portion 24 delineates an upper interior surface 26. The first and second side carcass portions 20, 22 delineate first and second concave interior surfaces 28, 30, respectively. The first and second concave interior surfaces 28, 30 adjoin the upper interior surface 26 on either side thereof.

In the example illustrated, the cover 16 is bonded directly to the carcass 12 at an interface to form a continuous body. The cover 16 includes a first side cover portion 32 covering the first side carcass portion 20, a second side cover portion 34 covering the second side carcass portion 22, and a central cover portion 36 of generally uniform thickness extending between the first and second side cover portions 32, 34, adjacent to the central carcass portion 24. The central cover portion 36 delineates an upper exterior surface 78. The upper exterior surface 78 may exhibit a minor convex curve, as illustrated.

In the example illustrated, the first and second side cover portions 32, 34 delineate first and second convex exterior surfaces 38, 40, respectively. The first and second convex exterior surfaces 38, 40 adjoin the top exterior surface 78 on either side thereof.

In the example illustrated, the first and second side cover portions 32, 34 further delineate generally opposed first and second side interior surfaces 42, 44, respectively. The first and second side cover portions 32, 34 may each have increasing thickness towards the first and second side interior surfaces 42, 44, respectively, which compensates for the tapering of the carcass 12.

In the example illustrated, the first and second side cover portions 32, 34 yet further delineate first and second lower interior surfaces 46, 48. The first lower interior surface 46 is shown adjoined between the first concave interior surface 28 and the first side interior surface 42, and the second lower interior surface 48 is shown adjoined between the second concave interior surface 30 and the second side interior surface 44, respectively.

In the example illustrated, the sliding layer 18 is secured to the upper interior surface 26, the first and second concave interior surfaces 28, 30, the first and second lower interior surfaces 46, 48, and the first and second side interior surfaces 42, 44. The sliding layer 18 may include curved ends that are embedded within the cover 16 adjacent to the first and second side interior surfaces 42, 44, as illustrated.

Figure 2:
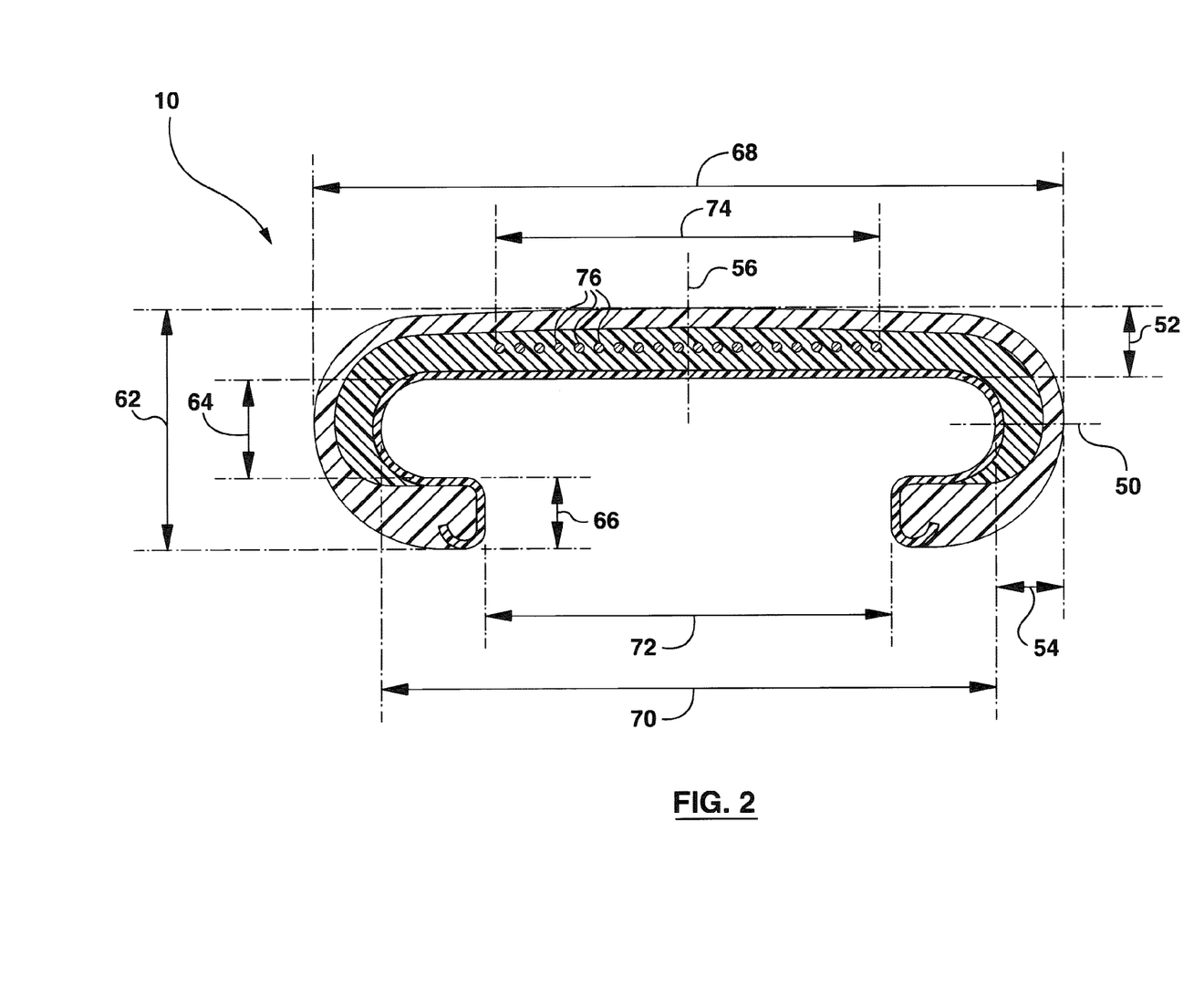
FIG. 2 is a further sectional view of the handrail.

Various dimensions of the handrail 10 are illustrated in FIG. 2. In the example illustrated, the handrail 10 has a face height 52 and a side width 54. The face height 52 is a vertical dimension at a central width axis 56 of the handrail 10 between a bottom surface 58 of the sliding layer 18 and the upper exterior surface 78 (the surfaces 58, 78 are shown in FIG. 1). The side width 54 is a horizontal dimension at a central height axis 50 of the handrail 10 between an inner side surface 60 of the sliding layer 18 and the second convex exterior surface 40 (the surfaces 60, 40 are shown in FIG. 1). The handrail 10 may be generally symmetrical about the central width axis 56, as illustrated, and therefore the side width may be the same on either side of the handrail 10.

The present disclosure is directed to handrails that are generally compact in size. In some examples, the face height 52 may be less than about 8.0 mm, and the side width 54 may be less than about 7.5 mm. In some examples, the face height 52 may be less than about 7.5 mm, and the side width 54 may be less than about 7.0 mm. In some examples, the face height 52 may be between 7.0 and 7.5 mm, and the side width 54 may be between 6.5 and 7.0 mm. The carcass 12 may constitute at least 60% of the face height 52 or the side width 54 dimensions of the handrail 10, as illustrated.

Vertical dimensions of the handrail 10 further include a handrail height 62, a slot height 64, and a lip height 66. Horizontal dimensions of the handrail 10 further include a handrail width 68, a slot width 70, a mouth width 72, and a stretch inhibitor width 74.

Referring to FIGS. 1 and 2, the stretch inhibitor 14 is shown formed of a plurality of longitudinal cables 76 disposed along a central plane within the central carcass portion 24. In the example illustrated, end ones of the cables 76 are offset inwardly in relation to the first and second side interior surfaces 42, 44. In other words, the stretch inhibitor width 74 is substantially less than the mouth width 72. In operation, having the ones of the cables 76 spaced away from regions of stress in the portions 20, 22, 32, 34 may affect the ability of the stretch inhibitor 14 to retain a neutral plane during flexing.

Dimensions for a particular example of the handrail 10 are provided in Table 1. These dimensions are intended to be illustrative but non-limiting.

TABLE 1

| Dimension | Reference | mm |
| --- | --- | --- |
| face height | 52 | 7.0 |
| side width | 54 | 6.5 |
| handrail height | 62 | 23.5 |
| slot height | 64 | 9.5 |
| lip height | 66 | 7.0 |
| handrail width | 68 | 72.0 |
| slot width | 70 | 59.0 |
| mouth width | 72 | 39.0 |
| stretch inhibitor width | 74 | 37.2 |

The compact construction of the handrail 10 may reduce the power required to drive the handrail 10. For example, the handrail 10 may be approximately 30 to 40% less weight than a traditional handrail product that it is intended to replace. This reduction in weight will translate to lower power consumption on escalators, moving walkways and/or other transportation apparatus.

Due to the compact sizing, the inventors have recognized that appropriate materials selection for the components is required to achieve satisfactory mechanical properties of the handrail 10.

The carcass 12 may be formed of a first thermoplastic material, the cover 16 may be formed of a second thermoplastic material, and the sliding layer 18 may be formed of a fabric material. The first thermoplastic material of the carcass 12 is generally stiffer and harder than the second thermoplastic material of the cover 16, and serves to retain the mouth width 72 to provide a desired lip stiffness. The carcass 12 also serves to protect the stretch inhibitor 14, which in this case is formed of the cables 76, and the bond between the cables 76 and the first thermoplastic material of the carcass 12 may be improved by adhesive (not shown).

For the carcass 12, polyester thermoplastic polyurethane may be implemented as the first thermoplastic material. In some examples, the first thermoplastic material of the carcass 12 may have a modulus at 100% elongation of between about 10 and 16 MPa and a hardness of between about 93 and 96 Shore A. In some particular examples, the first thermoplastic material of the carcass 12 may have a modulus of between about 12 and 15 MPa at 100% elongation and a hardness of between 94 and 95 Shore A. Exemplary specifications for the first thermoplastic material of the carcass 12 are provided in Table 2, which are intended to be illustrative but non-limiting.

TABLE 2

| Property | Specification | Units | Comments |
|---|---|---|---|
| Formulation | Polyester TPU | — | With anti-hydrolysis agent |
| Hardness | 93-96 | Shore A | ASTM D2240-00 |
| Tensile Strength | 40 (minimum) | MPa | ASTM D412 |
| Ultimate Elongation | 400 (minimum) | % | ASTM D412 |
| Modulus @ 100% Elongation | 10-16 | MPa | ASTM D412 |
| Glass Transition | −20 (maximum) | °C. | By differential scanning calorimetry |
| Processing | Extrusion | — | — |
| Melt Index | 5-20 | g | 190° C./8700 g ASTM D1238 |

For the cover 16, polyester thermoplastic polyurethane may be implemented as the second thermoplastic material. In some examples, the second thermoplastic material of the cover 16 may have a relatively low melt flow index, for example, on the order of between about 20 and 60 g under the conditions listed in table 3. In some particular examples, the second thermoplastic material of the cover 16 may have a melt flow index of between about 20 and 40 g under the conditions listed in table 3, and a broad molecular weight distribution so that a sharp melting point is avoided. Exemplary specifications for the second thermoplastic material of the cover 16 are provided in Table 3, which are intended to be illustrative but non-limiting.

TABLE 3

| Property | Specification | Units | Comments |
|---|---|---|---|
| Formulation | Polyester TPU | — | With anti-hydrolysis agent |
| Hardness | 83-87 | Shore A | ASTM D2240-00 |
| Tensile Strength | 40 (minimum) | MPa | ASTM D412 |
| Ultimate Elongation | 500 (minimum) | % | ASTM D412 |
| Modulus @ 100% Elongation | 4-6 | MPa | ASTM D412 |
| Glass Transition | −20 (maximum) | °C. | By differential scanning calorimetry |
| Processing | Extrusion | — | Broad molecular weight distribution |
| Melt Index | 20-40 | g | 210° C./3800 g ASTM D1238 |

Exemplary specifications for the cables 76 of the stretch inhibitor 14 are provided in Table 4, which are intended to be illustrative but non-limiting.

TABLE 4

| Property | Specification | Units |
|---|---|---|
| Type | High Tensile Steel Cord, brass plated | — |
| Construction | Inner 3 × 0.20 ± 0.01 Outer 6 × 0.35 ± 0.01 | mm |
| Twist | 9.5 ± 0.5 mm S 18.0 ± 0.9 mm Z | 1 turn per |
| Linear Density | 5.34 ± 0.27 | g/m |
| Diameter | 1.13 ± 0.06 | mm (in) |
| Strength | 1870 (minimum) | N |

For the sliding layer 18, a woven spun polyester textile fabric may be used. In some examples, a three ply yarn may have residual shrinkage of at least 7.0% under the conditions provided in table 6. In some examples, the woven fabric may have a minimum warp shrinkage of at least 8.75%. These high shrinkage values may be required so that the fabric shrinks and tightens in the process. Use of yarns and fabrics with lower shrinkage (generally referred to as "high tenacity") may result in the textile being stretched in the process and this stretch may be frozen or otherwise retained in the product after processing, thereby resulting in a higher modulus textile layer and a stiffer product. Exemplary specifications for the sliding layer 18 are provided in Tables 5, 6 and 7, which are intended to be illustrative but non-limiting.

TABLE 5

STAPLE FIBERS

| Property | Specification | Units | Test Method |
|---|---|---|---|
| Fiber Type | Polyester | — | — |
| Staple Fiber Linear Density | 1.28 nominal | Denier | AATCC 20 |
| Staple Length | 38-52 | mm | ASTM D5103 |
| Melting Point (Peak - by DSC) | 255 | °C. | ASTM D3418 |

TABLE 6

YARN

| Property | Specification | Units | Test Method |
|---|---|---|---|
| Type | Spun Polyester | — | — |
| Yarn count | 12 (50) | Cotton Count (Tex) | ASTM D1907 |
| Anti-Static filament | 22 | Denier | ASTM D1433 |
| Yarn Twist | 11.4 ± 0.8 | TPI | ASTM D1433 |
| Yarn Strength | 4.5 (minimum) | kg/end | ASTM D2256 |
| Yarn Elongation at Break | 20 | % | ASTM D2256 |
| Residual Shrinkage (Method: Dry-Heat Exposure; 75 s at 200° C.) | 7.0 (minimum) | % | ASTM 2259 |
| Number Yarns in Standard Ply | 3 (12/3 construction) | — | — |
| Anti-Static Ply Construction | 3 standard yarns (standard ply) blended with 1 anti-static filament | — | — |
| Ply Twist | 6.0 + 1/−0.5 | TPI | — |

TABLE 7

WOVEN FABRIC

| Property | Specification | Units | Test Method |
| --- | --- | --- | --- |
| Weave | Venetian | — | — |
| Anti-static plied yarn addition level | 20% warp yarns spaced approximately every 5$^{th}$ warp end | — | — |
| Width | 1448 ± 13 | mm | — |
| Roll Length | 360 ± 10 | m | — |
| Maximum O.D. of roll | 648 | mm | — |
| Warp Count (Ends) | 47 ± 1 | EPI | — |
| Weft (fill) Count (Picks) | 44 ± 1 | EPI | — |
| Fabric Weight | 607 ± 34 | g/m² | — |
| Wide-Width Tensile, Warp × Weft | 800 × 800 (minimum) | N/cm | — |
| Gauge | 1.02 ± 0.08 | mm | — |
| Crimp, Warp | 20 ± 5 | % | — |
| Crimp, Weft | 5 ± 2 | % | — |
| Warp Shrinkage | 8.75 (minimum) | % | — |
| Surface Resistivity | 1 × 10$^{12}$ (maximum) | Ω/square | ASTM D257 |

The sliding layer 18 may be prepared generally in accordance with the pretreatment methods and apparatuses disclosed in International Publication No. WO/2009/033273. However, the inventors have developed the following pretreatment and testing procedure for the handrail 10:

1. Using a knife, cut a sample piece of fabric from a bulk roll to be tested. For example, the sample may have a length of 40 to 60 cm, and a width of no greater than 20 cm.
2. Using a pen, draw a plurality of lines of various lengths in both warp and weft direction for measuring. For example, 4 to 6 lines of various lengths from 50 mm to 10 mm.
3. Using a set of calipers, measure the length of each of the lines accurately to a tenth of a millimeter and record values.
4. Set two heated plates, arranged to provide heat to both sides of the fabric, at a temperature of 200±3° C., and with a gap of approximately 3 mm between the plates.
5. Insert the fabric between the plates in the gap for 75±1 s.
6. Let sample cool for approximately 2 m after removal from the plates.
7. Using the calipers, measure each line again and record the results.
8. Calculate shrinkage percentage for each measured line according to equation (1).

$$\text{Shrink Percentage} = \frac{\text{Initial Length} - \text{Final Length}}{\text{Initial Length}} \times 100\% \quad (1)$$

Exemplary results of the pretreatment and testing procedure are provided in Table 8.

TABLE 8

| Sample | Starting (mm) | Shrunk (mm) | % Change |
| --- | --- | --- | --- |
| Width | 138 | 125 | 9.42 |
| Warp #1 | 105.15 | 95.12 | 9.54 |
| Warp #2 | 100.88 | 90.54 | 10.25 |
| Warp #3 | 100.28 | 88.61 | 11.64 |
| Weft #1 | 100.99 | 91.3 | 9.60 |
| Weft #2 | 103.05 | 93.06 | 9.69 |
| Weft #3 | 101.44 | 91.12 | 10.17 |
| Avg Warp % Change | | | 10.48 |
| Avg Weft % Change | | | 9.82 |

As noted in Table 7, shrinkage in the warp direction during the pretreatment should be at minimum 8.75% to yield a fabric that is both flexible and strong. The inventors have found that if the fabric used for the sliding layer does not shrink in the warp direction by at least 8.75% during pretreatment, the performance of the handrail 10 in dynamic testing may be compromised. Shrinkage in the weft direction has been found to be less important on the mechanical properties of the resulting handrail 10.

The handrail 10 as disclosed herein may exhibit enhanced mechanical properties.

Figure 3:
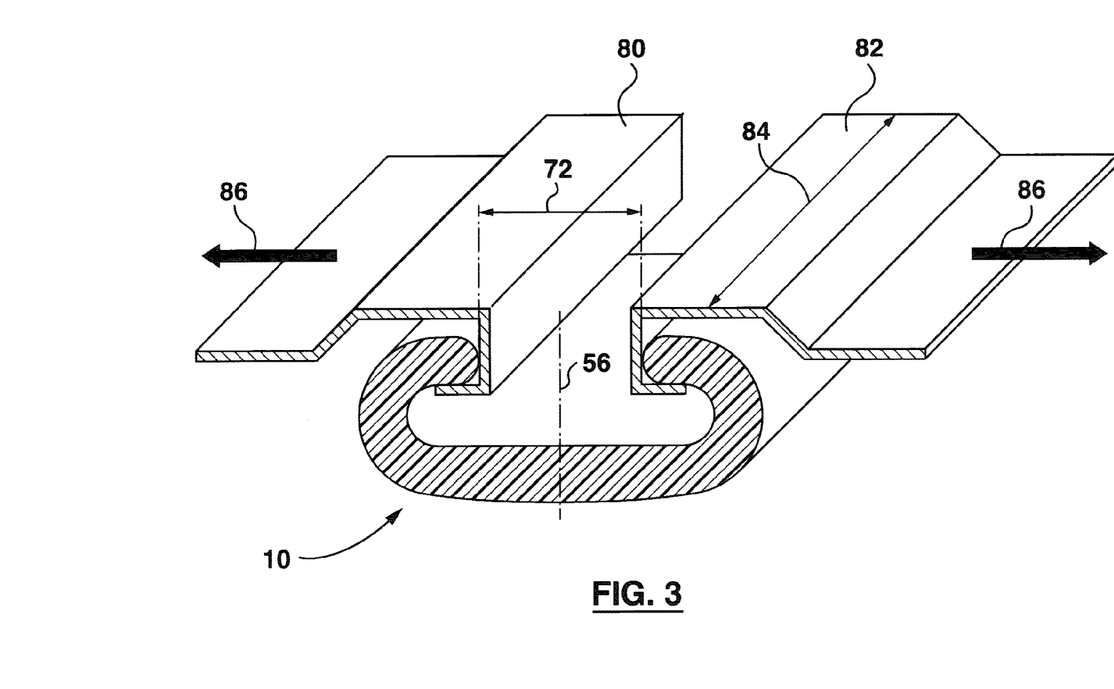
FIG. 3 is a schematic view of a test arrangement for lip stiffness of the handrail.

Lip stiffness refers to the force required to open the handrail lip apart using two mechanical jaws seated inside the handrail lip. This is one particular characteristic of the handrail 10 that may be important, as it is a safety consideration that relates to the ability of the handrail to resist being pulled off of its guide. Referring to FIG. 3, to test lip stiffness, first and second jaw elements 80, 82 may be arranged to transfer load to a test piece of the handrail 10 on opposing sides of the axis 56. The first and second jaw elements 80, 82 may apply the load to the first and second side interior surfaces 42, 44 (FIG. 1). Each of the first and second jaw elements 80, 82 extend a length 84. The length 84 may be, for example, 30 mm, and the length of the test piece should substantially exceed the length 84 to avoid end effects. A lip stiffness value may be defined as the amount of force 86 necessary to increase the mouth width 72 by a predetermined amount. In some examples, at least 10 kg is required to increase the mouth width 72 by 7 mm in an extruded section. In other examples, 7 kg may be required to increase the mouth width 72 by 7 mm in a spliced section, in which a joint is formed between ends of two separate lengths of the handrail 10. A spliced section may be lower strength due to it being heat treated, for example, in accordance with the methods and apparatuses disclosed in International Publication No. WO 97/37834, the entire contents of which are hereby incorporated herein by reference.

Figures 4, 5:
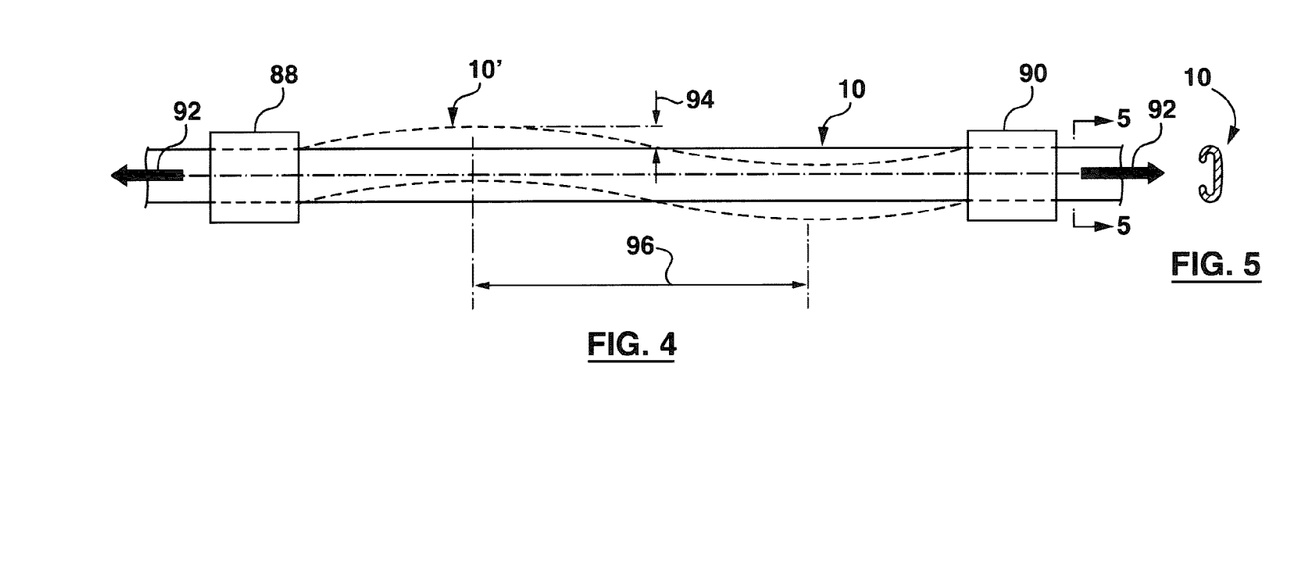
FIG. 4 is a schematic view of a test arrangement for straightness of the handrail.
FIG. 5 is a sectional view of FIG. 4.

The handrail 10 may also be relatively good at maintaining straightness along its length under tension. Referring to FIGS. 4 and 5, the handrail is held between first and second supports 88, 90, and a tension force 92 to its ends. A straightness value may be defined as a maximum deviation 94 along a minimum length 96 of the handrail 10' in tension. In some examples, the handrail 10 may exhibit a maximum deviation 94 of 1 mm, along a minimum length 96 of 300 mm and a tension force 92 of 1000 N.

Another characteristic that may be measured is the force required for forward bending. A nominal force of 20 N may be required to bend an 800 mm length of the handrail 10 90° over a jig with radius of 305 mm, with a maximum lip dimensional change while bent being +3/−1 mm. For backward bending, a nominal force of 25 N may be required to bend a 1700 mm length of the handrail 10 90° over a jig with radius of 610 mm, with a maximum lip dimensional change while bent being +3/−1 mm.

Furthermore, there is a permitted bending radii that allows the handrail 10 to bend and flex with relatively smooth transitions. For a reverse (negative) bend, the handrail 10 may exhibit a 380 mm minimum bending radii. For a forward (positive) bend, the handrail 10 may exhibit a 180 mm minimum bending radii.

Figure 6:
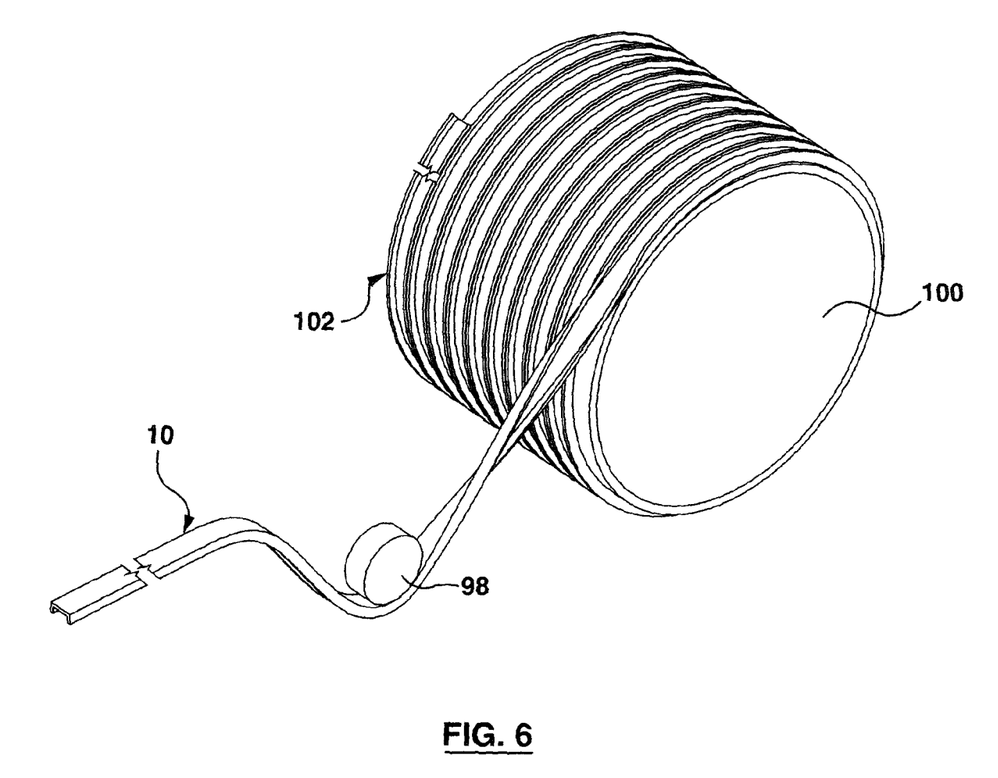
FIG. 6 is a schematic view of the handrail being reverse bend wound.

The handrail 10 may be manufactured generally in accordance with the extrusion methods and apparatuses disclosed in International Publication No. WO/2009/033270. However, after extruding and cooling the handrail 10, it may be desirable store the handrail 10 in a reverse bend orientation. Referring to FIG. 6, a roller 98 may be used to invert the orientation of the handrail 10 and supply it to a reel 100. The reel 100 should have a diameter that is sufficient to accommodate the permitted reverse bending radii of the handrail 10. The handrail 10 is wound about the reel 100 to form a spool 102 of the handrail 10 maintained in a reverse bend orientation. The reel 100 may then be stored or transported.

Storing and aging the freshly extruded handrail 10 in this manner places the thermoplastic components furthest from the cables 76 and the neutral axis and under slight tension. This is built in to the structure as the thermoplastic materials reach their final properties and shape while aging on the reel for an extended period of time, for example, 48 hours or more. In some examples, the handrail 10 in the reverse bend orientation may age on the reel for 7 days or more. This built in stress essentially makes the handrail 10 below the neutral axis longer so that the effects of thermoplastic and slider fabric shrinkage are negated to some degree. If the handrail 10 is stored rolled in the forward direction, the handrail 10 may have a permanent forward set so that it may be difficult to handle, more force may be required to bend it in the reverse direction, and it may be more prone to collapsing while bending. In contrast, when the handrail 10 is aged rolled in the reverse orientation, it may come off the reel and lay flat making handling easier, it may require less force to bend in reverse, and may be less prone to kinking. This may be important with a compact product as the thinner cross section may be more prone to collapse and kinking.

Figure 7:
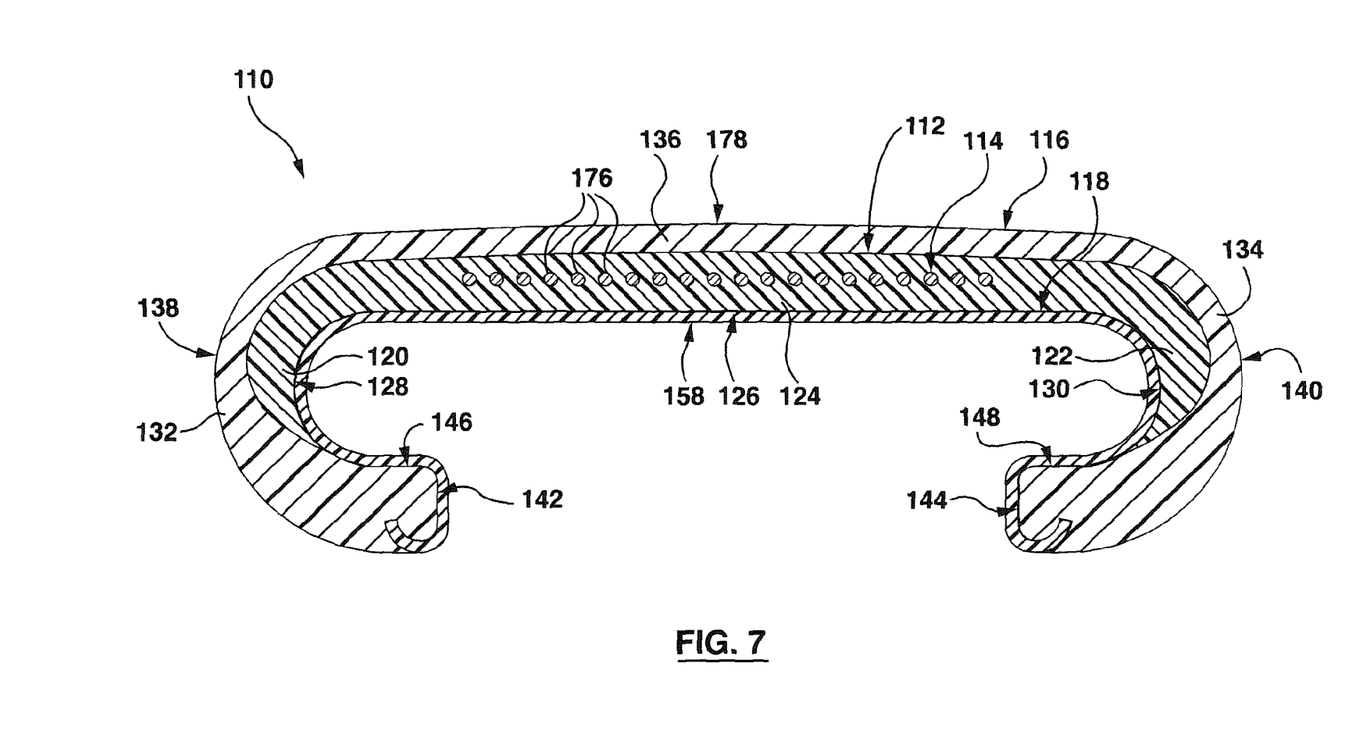
FIG. 7 is a sectional view of another example of a handrail.

Referring to FIG. 7, another handrail is shown generally at reference numeral 110. For simplicity, similar components are given corresponding reference numerals as in FIG. 1 and the description is not repeated. Compared to the handrail 10, the carcass 112 of the handrail 110 tapers more quickly in thickness around the first and second side carcass portions 120, 122, and therefore terminates further away from the first and second side interior surfaces 142, 144. Due to the reduction of the first thermoplastic material in the carcass 112, and the resultant increase in the second thermoplastic material in the cover 116, the handrail 110 would exhibit lower lip stiffness compared to the handrail 10.

Figure 8:
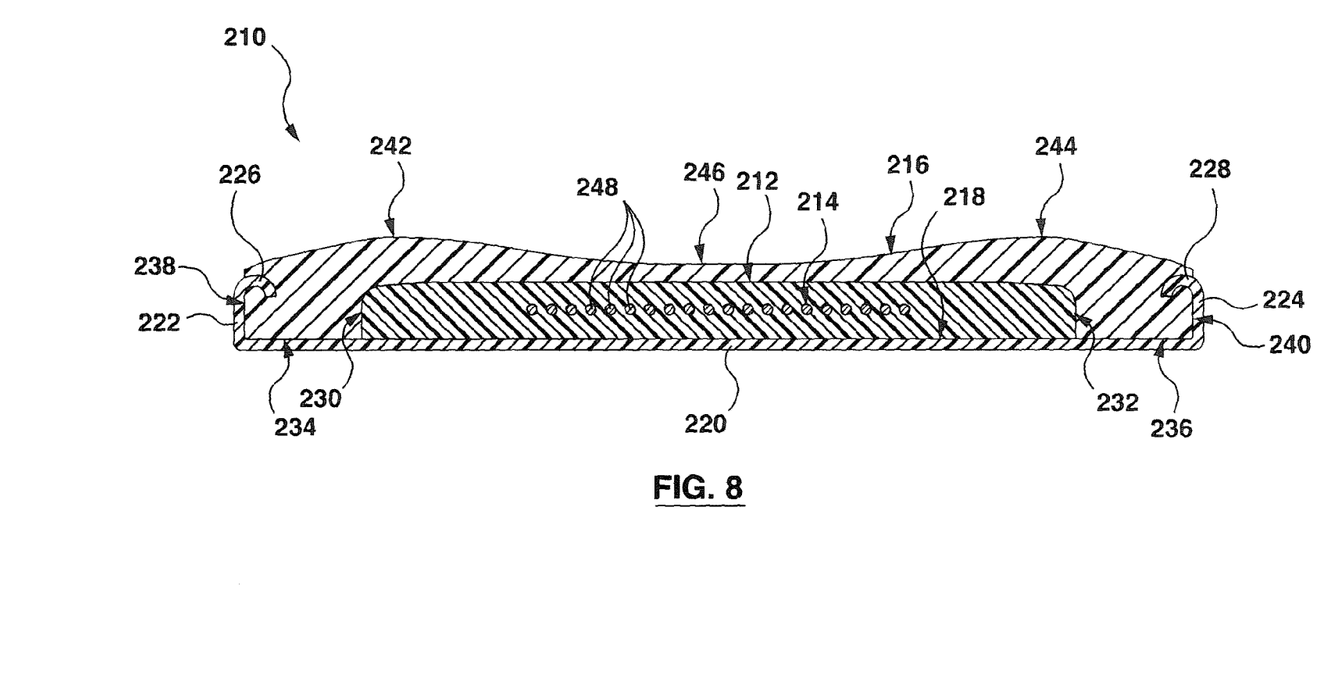
FIG. 8 is a sectional view of an example of an intermediate handrail product.

Referring to FIG. 8, an intermediate handrail product is shown generally at reference numeral 210. The intermediate handrail product 210 includes a carcass 212, a stretch inhibitor 214, a cover 216, and a sliding layer 218. Materials for each of the components of the intermediate handrail product 210 may be similar to that described above for the handrail 10.

In the example illustrated, the sliding layer 218 includes a planar portion 220 and first and second upstanding edge portions 222, 224. The upstanding edge portions 222, 224 are shown to have curved ends 226, 228, respectively, that are embedded within the cover 216.

In the example illustrated, the carcass 212 is on the sliding layer 218 and centrally disposed between the first and second upstanding edge portions 222, 224. The carcass 212 is shown to be generally rectangular, and has rounded upper corners arranged between first and second edges 230, 232 and a top surface of the carcass 212.

The cover 216 covers the carcass 212 and extends between the first and second upstanding edge portions 222, 224. In the example illustrated, the cover 216 contacts the carcass 212 at an interface to form a continuous body. The cover 216 is shown to include first and second bottom surfaces 234, 236, which are in contact with the planar portion 220 of the sliding layer 218 between the upstanding edge portions 222, 224 and the edges 230, 232 of the carcass 212. The cover 216 further includes first and second side surfaces 238, 240, which are in contact with the upstanding edge portions 222, 224 of the sliding layer 218, respectively.

In the example illustrated, the cover 216 includes an upper surface having first and second raised portions 242, 244 and a valley 246 between the first and second raised portions 242, 244. The valley 246 defines a concave shape between the first and second raised portions 242, 244.

In the example illustrated, the stretch inhibitor 214 is formed of a plurality of longitudinal cables 248, which are shown disposed along a central plane within the carcass 212.

Figure 9:
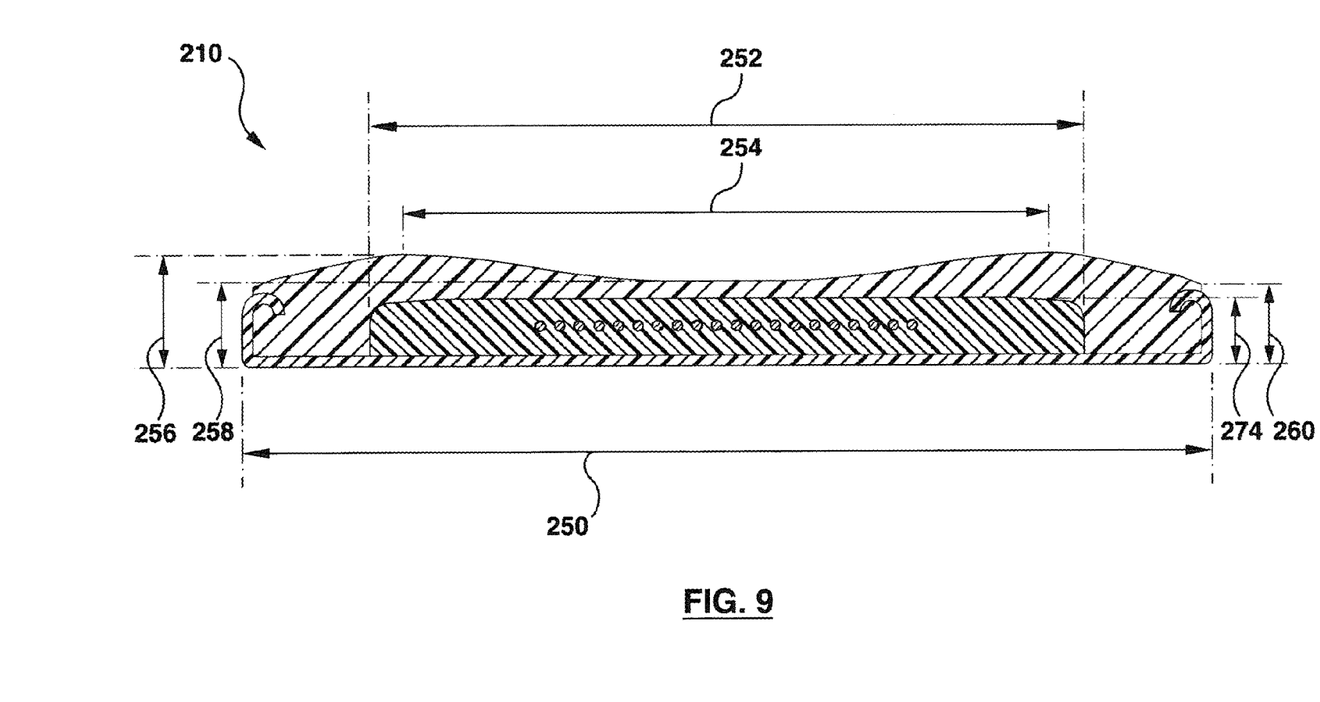
FIG. 9 is a further sectional view of the intermediate handrail product.

Various dimensions of the intermediate handrail product 210 are illustrated in FIG. 9. In the example illustrated, the intermediate handrail product 210 has a product width 250, carcass width 252, a valley width 254, a raised height 256, a central height 258, an edge height 260, and a carcass height 274.

In the example illustrated, the first and second raised portions 242, 244 are shown offset inwardly in relation to the edges 230, 232 of the carcass 212. In other words, the valley width 254 is substantially less than the carcass width 252.

Dimensions for a particular example of the intermediate handrail product 210 are provided in Table 9. These dimensions are intended to be illustrative but non-limiting.

TABLE 9

| Dimension | Reference | mm |
| --- | --- | --- |
| product width | 250 | 92.0 |
| carcass width | 252 | 67.0 |
| valley width | 254 | 62.0 |
| raised height | 256 | 10.5 |
| central height | 258 | 8.2 |
| edge height | 260 | 7.25 |
| carcass height | 274 | 6.0 |

As mentioned above, the handrail 10 may be manufactured generally in accordance with the extrusion methods and apparatuses disclosed in International Publication No. WO/2009/033270. The intermediate handrail product 210 may be an extrudate product that is extruded out of a die assembly (not shown), and requires further processing to obtain the final, desired profile of the handrail 10 as shown in FIG. 1.

Figure 10:
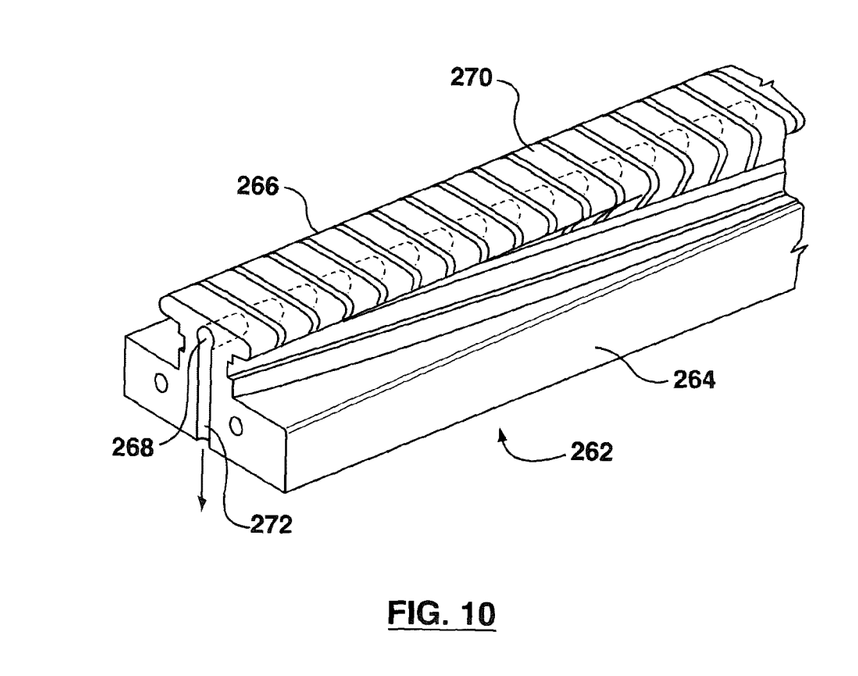
FIG. 10 is a perspective view of part of a mandrel for forming the handrail from the intermediate handrail product.

Referring to FIG. 10, an elongate primary mandrel 262 may be used to shape the intermediate handrail product 210 into the final profile of the handrail 10 (FIG. 1). The mandrel 262 may include a number of sections. In the example illustrated, the mandrel 262 has a base 264 and an upper section 266 defining a support surface. The profile of the upper section 266 changes progressively and smoothly, to form the final handrail profile.

In the example illustrated, extending longitudinally along the upper section 266 is a bore 268 into which opens into slots 270. A transverse port 272 opens into the bore 268. The port 272 is connected to a vacuum source. This maintains a vacuum within the bore 268, for example, in the range of 8 to 12 inches of mercury. The purpose of the vacuum is to ensure that the sliding layer 218 closely follows the mandrel 262. The level of the vacuum may be determined by that necessary to ensure good accurate following of the mandrel 262 profile, while at the same time not being too high so as to create excessive drag. If a high degree of vacuum is used, then a higher tension may have to be applied to pull the handrail along the mandrel, and this may stretch the sliding layer 218. The exact length of the mandrel 112 will depend upon the intended production rate.

As the intermediate handrail product 210 is guided along the mandrel 262, outer edges of the intermediate handrail product 210 are dropped downwardly, so as to have the effect of lessening the height of the first and second raised portions 242, 244 (FIG. 8). The first and second raised portions 242, 244 provide additional material to account for the curved shaped of the first and second side cover portions 32, 34 in the final profile of the handrail 10 (FIG. 1).

As the intermediate handrail product 210 is guided along the mandrel 262, the upstanding edge portions 222, 224 of the sliding layer 218 may be continuously supported along the mandrel 112 and progressively dropped downwardly until they are generally horizontal, and then continued to be turned inwardly to form the final C-shaped profile of the handrail 10 (FIG. 1). It will be appreciated therefore that the surfaces 238, 240 in the intermediate handrail product 210 correspond to the surfaces 42, 44 in the handrail 10, respectively, and further that the surfaces 234, 236 in the intermediate handrail product 210 correspond to the surfaces 46, 48 in the handrail 10, respectively.

The temperature conditions in the die assembly may be such that, on leaving the die assembly, the thermoplastic materials of the intermediate handrail product 210 are still molten. Along the mandrel 262, the sliding layer 218 remains solid throughout the forming process and serves as the contact surface, and the molten thermoplastic materials may be untouched. The mandrel 262 may be heated or cooled in order to maintain the intermediate handrail product 210 at an ideal forming temperature. Depending on the production speeds at which the extrudate travels across the mandrel 262, cooling may in fact be necessary to maintain the mandrel at an appropriate temperature, for example, 50° C.

At the end of the mandrel 262, the finished profile of the handrail 10 may be formed, and the thermoplastic materials may still not be properly solidified. To cool and solidify the thermoplastic materials, the handrail 10 may be passed into a cooling unit (not shown). A plurality of rollers (not shown) may also be implemented to cool and effect the skinning of the exterior of the handrail 10, the removal of die lines, and/or additional shaping of the exterior surface of the handrail 10.

It will be appreciated that terms used herein to convey geometrical or mathematical relationships need not be construed with absolute precision. For example, the terms 'concave' and 'convex' as used herein need not be interpreted to mean structures having a curved surface that is exactly circular. These terms and other terms herein may be interpreted with some flexibility, without strict adherence to mathematical definitions, as will be appreciated by persons skilled in the art.

While the above description provides examples of one or more apparatuses or methods, it will be appreciated that other apparatuses or methods may be within the scope of the accompanying claims.

We claim:

1. A handrail, comprising:
   a carcass comprising a first side carcass portion, a second side carcass portion spaced apart from the first side carcass portion, and a central carcass portion of generally uniform thickness extending between the first and second side carcass portions, the carcass tapering in thickness around the first and second side carcass portions, the central carcass portion defining an upper interior surface, and the first and second side carcass portions defining first and second concave interior surfaces, respectively, adjoining the upper interior surface on either side thereof;
   a stretch inhibitor arranged within the central carcass portion;
   a cover bonded to the carcass, the cover comprising a first side cover portion covering the first side carcass portion, a second side cover portion covering the second side carcass portion, and a central cover portion of generally uniform thickness extending between the first and second side cover portions adjacent to the central carcass portion, the central cover portion defining an upper exterior surface, the first and second side cover portions defining first and second convex exterior surfaces, respectively, adjoining the top exterior surface on either side thereof, the first and second side cover portions further defining generally opposed first and second side interior surfaces, respectively, and the first and second side cover portions yet further defining first and second lower interior surfaces, respectively, adjoined between the first and second concave interior surfaces and the first and second side interior surfaces, respectively; and
   a sliding layer secured at least to the upper interior surface and the first and second concave interior surfaces,
   wherein, at a central width axis of the handrail, a face height between the upper exterior surface and a bottom surface of the sliding layer is less than about 8.0 mm,
   wherein the carcass is formed of a first thermoplastic material, the cover is formed of a second thermoplastic material, and the first thermoplastic material is harder than the second thermoplastic material,
   wherein the first thermoplastic material has a modulus at 100% elongation of between 10 and 16 MPa and a hardness of between 93 and 96 Shore A, and
   wherein a lip stiffness force of at least 10 kg is required to increase a mouth width between the first and second side interior surfaces by 7 mm in an extruded section of the handrail, measured using first and second jaw elements applying load to the first and second side interior surfaces, respectively, of a test piece of the extruded section, each of the first and second jaw elements extending a length of approximately 30 mm, and the length of the test piece substantially exceeding the length of the first and second jaw elements.

2. The handrail of claim 1, wherein the face height is between 7.0 mm and 7.5 mm.

3. The handrail of claim 2, wherein, at a central height axis of the handrail, side thickness dimensions between each of the first and second convex exterior surfaces and a respective inner surface of the sliding layer is less than about 8.0 mm.

4. The handrail of claim 3, wherein the side thickness dimension is between 7.0 mm and 7.5 mm.

5. The handrail of claim 1, wherein the first thermoplastic material has a modulus at 100% elongation of between 12 and 15 MPa, and the first thermoplastic material has a hardness of between 94 and 95 Shore A.

6. The handrail of claim 5, wherein the first thermoplastic material is polyester thermoplastic polyurethane having a melt flow index of between 5 and 20 g, and the second thermoplastic material is polyester thermoplastic polyurethane having a melt flow index of between 20 and 40 g.

7. The handrail of claim 1, wherein the sliding layer comprises yarns having a residual shrinkage of at least 7.0%.

8. A handrail, comprising:
   a carcass comprising a first side carcass portion, a second side carcass portion spaced apart from the first side carcass portion, and a central carcass portion of generally uniform thickness extending between the first and second side carcass portions, the carcass tapering in thickness around the first and second side carcass portions, the central carcass portion defining an upper interior surface, and the first and second side carcass portions defining first and second concave interior surfaces, respectively, adjoining the upper interior surface on either side thereof;
   a stretch inhibitor arranged within the central carcass portion;
   a cover bonded to the carcass, the cover comprising a first side cover portion covering the first side carcass portion, a second side cover portion covering the second side carcass portion, and a central cover portion of generally uniform thickness extending between the first and second side cover portions adjacent to the central carcass portion, the central cover portion defining an upper exterior surface, the first and second side cover portions defining first and second convex exterior surfaces, respectively, adjoining the top exterior surface on either side thereof, the first and second side cover portions further defining generally opposed first and second side interior surfaces, respectively, and the first and second side cover portions yet further defining first and second lower interior surfaces, respectively, adjoined between the first and second concave interior surfaces and the first and second side interior surfaces, respectively; and
   a sliding layer secured at least to the upper interior surface and the first and second concave interior surfaces,
   wherein, at a central width axis of the handrail, a face height between the upper exterior surface and a bottom surface of the sliding layer is less than about 8.0 mm,
   wherein the carcass is formed of a first thermoplastic material, the cover is formed of a second thermoplastic material, and the first thermoplastic material is harder than the second thermoplastic material,
   wherein the first thermoplastic material has a modulus at 100% elongation of between 10 and 16 MPa and a hardness of between 93 and 96 Shore A, and
   wherein a lip stiffness force of at least 7 kg is required to increase a mouth width between the first and second side interior surfaces by 7 mm in a spliced section of the handrail, measured using first and second jaw elements applying load to the first and second side interior surfaces, respectively, of a test piece of the spliced section, each of the first and second jaw elements extending a length of approximately 30 mm, and the length of the test piece substantially exceeding the length of the first and second jaw elements.

9. The handrail of claim 8, wherein the first thermoplastic material has a modulus at 100% elongation of between 12 and 15 MPa, and the first thermoplastic material has a hardness of between 94 and 95 Shore A.

10. The handrail of claim 9, wherein the first thermoplastic material is polyester thermoplastic polyurethane having a melt flow index of between 5 and 20 g, and the second thermoplastic material is polyester thermoplastic polyurethane having a melt flow index of between 20 and 40 g.

11. The handrail of claim 8, wherein the sliding layer comprises yarns having a residual shrinkage of at least 7.0%.

12. An intermediate handrail product, comprising:
    a sliding layer comprising a planar portion and first and second upstanding edge portions;
    a carcass on the sliding layer and centrally disposed between the first and second upstanding edge portions, the carcass being generally rectangular and comprising first and second edges;
    a stretch inhibitor arranged within the carcass; and
    a cover covering the carcass, and extending between the upstanding edge portions,
    wherein, between each of the upstanding edge portions and the respective edge of the carcass, the cover contacts the sliding layer, and
    wherein:
       the carcass is formed of a first thermoplastic material, the cover is formed of a second thermoplastic material, and the first thermoplastic material is harder than the second thermoplastic material;
       the first thermoplastic material has a modulus at 100% elongation of between 12 and 15 MPa and a hardness of between 94 and 95 Shore A; and
       the first thermoplastic material is polyester thermoplastic polyurethane having a melt flow index of between 5 and 20 g, and the second thermoplastic material is polyester thermoplastic polyurethane having a melt flow index of between 20 and 40 g.

13. The intermediate handrail product of claim 12, wherein the cover comprises first and second bottom surfaces that are in contact with the planar portion.

14. The intermediate handrail product of claim 13, wherein the cover comprises first and second side surfaces that are in contact with the first and second upstanding edge portions, respectively.

15. The intermediate handrail product of claim 14, wherein the cover comprises an upper surface having first and second raised portions and a valley between the first and second raised portions.

16. The intermediate handrail product of claim 15, wherein the first and second raised portions are offset inwardly in relation to the respective first and second edges of the carcass.

17. The intermediate handrail product of claim 16, wherein:
    a central height dimension between the valley and an inner surface of the sliding layer is about 8.2 mm;
    a raised height dimension between the first and second raised portions and the inner surface of the sliding layer is about 10.5 mm; and
    a valley width dimension between the first and second raised portions is about 62.0 mm.

18. The intermediate handrail product of claim 17, wherein:
    a carcass height dimension between a top surface of the carcass and an inner surface of the sliding layer is about 6.0 mm;
    a carcass width dimension between the first and second edges of the carcass is about 67.0 mm; and
    a product width dimension between outer surfaces of the upstanding edge portions is about 92.0 mm.

19. The intermediate handrail product of claim 16, wherein each of the upstanding edge portions comprises a curved end that is embedded within the cover.

20. The intermediate handrail product of claim 12, wherein the sliding layer comprises yarns having a residual shrinkage of at least 7.0%.

\* \* \* \* \*